Patented Aug. 18, 1953

2,649,485

UNITED STATES PATENT OFFICE 2,649,485

PRODUCTION OF METHYL ACETYLENE

Arthur William Charles Taylor, David Gwyn Jones, and Morag Lauchlan Allan, Norton-on-Tees, England, assignors to Imperial Chemical Industries Limited, a corporation of Great Britain No Drawing. Application January 3, 1950, Serial No. 136,654. In Great Britain January 18, 1949

7 Claims. (Cl. 260—678)

This invention relates to the production of methyl acetylene and allene.

According to the present invention there is provided a process for the production of methyl acetylene and allene, which comprises the step of subjecting a dihalogenated propane or a monohalogenated propylene, or a mixture thereof, to decomposition at a temperature of 850 to 1050° C.

Any of the isomeric dihalopropanes and monohalopropylenes may be used in the process of the present invention but it is preferred to employ the chloro compounds and, in particular, alpha and beta monochloropropylene. When a dichloropropane is used as starting material it is possible, as already stated, to convert this directly to methyl acetylene, but it may be conveniently to a monochloropropylene by any suitable method, for example, by treatment with alkali, and the resulting monochloropropylene subjected to decomposition by heating it at a temperature of 850 to 1050° C.

The halogenated hydrocarbon may be decomposed in the pure state, but it is preferred to mix this compound with a diluent gas prior to subjecting it to decomposition. Suitable diluents are, for example, nitrogen, methane and carbon dioxide. In a preferred embodiment of the present invention, however, steam is employed as the diluent, the amount used being such that the molar ratio of steam to chlorinated hydrocarbon is from 8:1 to 20:1.

It is preferred to carry out the decomposition in a manner such that the chlorinated hydrocarbon is maintained at a temperature of 850 to 1050° C. for a short period only. Thus, when the reaction is carried out by passing the chlorinated hydrocarbon through a reaction zone maintained at the desired temperature, the velocity at which the hydrocarbon vapour is passed through the zone must be carefully controlled, so that the vapour is subjected to the decomposition temperature for a suitable period of time. In particular, the best results are obtained when the chlorinated hydrocarbon is in the reaction zone for 0.01 to 0.1 second (based on the volume of gas calculated at standard temperature and pressure).

The process of the present invention may be carried out by passing the chlorinated hydrocarbon through an unpacked tube, such as a silica tube, maintained at the desired temperature or the tube may contain a packing material, such as silica chips. It is advisable to pass the gaseous mixture through a preheating zone prior to introducing it into the reaction zone. For example, in the decomposition of a mixture of alpha and beta monochloropropylenes, it was found suitable to preheat the mixture by passing it initially through a zone heated at 550° C.

The reaction may also be carried out in an adiabatic manner by mixing the material to be decomposed with steam or other suitable diluent which has been previously raised to a suitable temperature and thereafter effecting the decomposition of the halogenated material in a suitable vessel, for example, a vessel lined with silica brick.

The chlorinated hydrocarbon may also be decomposed by passing it through a tube containing a catalyst such as, for example, a metal, a metal oxide, or a metal salt, e. g. a metal halide.

In the process of the present invention, a small amount of an activator may be introduced into the reaction zone. Such activators are substances, which, when present in small amounts, aid the conversion of a dichloropane to a monochloropropylene and/or the conversion of this monochloropropylene to methyl acetylene. The most important activators are free oxygen and halogens, particularly chlorine. Certain halogen-containing compounds which can liberate a small amount of free halogen under the conditions of reaction may also be employed, an example of this type of activator being thionyl chloride.

The products of the decomposition are preferably subjected to rapid cooling to prevent undesirable side reactions and this may be achieved by quenching the products with a suitable liquid medium.

In the process of the present invention allene may be formed as a by-product. This compound may be separated when desired, or preferably it may be recycled to the decomposition zone in which it is largely converted to methyl acetylene.

Example 1

93 grams of a mixture of alpha and beta chloropropylenes (boiling point 23–40° C.) and 304 grams of water were passed over a period of one hour through a silica tube having an internal diameter of 1.2 centimetres. The temperature in the silica tube was measured by a thermocouple inserted in a silica sheath, the latter passing along the centre of the silica tube and having an outer diameter of 0.8 centimetre. The gas mixture was preheated by passage through a 62 centimetre length of the silica tube maintained at a temperature of 550° C. after which it entered the decomposition zone, maintained at a temperature of 920° C., and occupying a length of 10.2 centimetres. By operating in this manner the vapour contact time calculated at 20° C. and atmospheric pressure was 0.05 second. The product contained 52.3 grams of unchanged chloropropylenes, 12.7 grams of hydrogen chloride, 8.0 grams of methyl acetylene and 1.6 grams of allene. The chloropropylene conversion calculated upon the amount of hydrogen chloride recovered was 28.6%. The pass yields of methyl acetylene and allene were respectively 16.5 and 3.6% and the yields 57.7 and 12.7% respectively.

*Example 2*

100 grams of allyl chloride and 198 grams of steam were passed through a silica tube, as described in Example 1, maintained at a temperature of 970° C. The vapour contact time, calculated at standard temperature and pressure was 0.07 second. The following products were isolated: methyl acetylene 1.65 grams, allene 0.58 gram, hydrogen chloride 26 grams, allyl chloride 13 grams. The conversion of allyl chloride based on the amount of hydrogen chloride recovered was 54.4%. The pass yields of methyl acetylene and allene were respectively 3.1% and 1.1% of theoretical and the yields of methyl acetylene and allene based on the calculated figure of allyl chloride conversion was 5.7% and 2.0% respectively.

*Example 3*

A mixture of 100 grams of 1:2 dichloropropane and 164 grams of steam was treated in the apparatus described in Example 1. The vapours were preheated at 850° C. and subjected to decomposition at 1000° C. The vapour contact time in the decomposition zone was 0.07 second. From the product the following compounds were recovered: methyl acetylene 3.03 grams, allene 0.86 gram, hydrogen chloride 55 grams, alpha and beta chloropropylene 4.5 grams and 1:2 dichloropropane 19 grams. The conversion of 1:2 dichloropropane based on the starting material recovered was 81%. The pass yields of methyl acetylene and allene were respectively 8.6% and 2.4% and the yields of methyl acetylene and allene, based on the amount of starting material converted, were 10.6 and 3% respectively.

*Example 4*

A mixture of 56 grams of 2:2 dichloropropane and 137 grams of steam was preheated at 800° C. and subjected to decomposition at 1000° C., using apparatus as described in Example 1. The vapour contact time in the decomposition zone was 0.05 second. The products recovered included methyl acetylene 3.73 grams, allene 6.56 grams, alpha and beta monochloropropylenes 10.1 grams and hydrogen chloride 24.7 grams. In this example the whole of the starting material was converted. The yields of methyl acetylene and allene were respectively 18.8% and 33.1% of theoretical.

*Example 5*

A mixture of 59 grams of 1:3 dichloropropane and 141 grams of steam was preheated at 800° C. and decomposed at 1000° C. in the apparatus described in Example 1. The vapour contact time in the decomposition zone was 0.05 second. From the product the following compounds were recovered: methyl acetylene 2.24 grams, allene 0.41 gram, alpha and beta monochloropropylenes 10.0 grams, hydrogen chloride 20.3 grams. In this example the starting material was completely converted. The yields of methyl acetylene and allene were respectively 10.7% and 2.0% of theoretical.

*Example 6*

A mixture of 47 grams of 1:1 dichloropropane and 150 grams of steam was preheated at a temperature of 500° C. and subjected to decomposition at 950° C. in the apparatus as described in Example 1. The vapour contact time was 0.05 second. The following compounds were recovered from the product: methyl acetylene 1.62 grams, allene 0.23 gram, hydrogen chloride 12.7 grams and alpha and beta monochloropropylenes 5.7 grams. The dichloropropane was completely converted. The yields of methyl acetylene and allene were respectively 9.7% and 1.4% of theoretical.

We claim:

1. A process for the production of methyl acetylene which comprises the step of subjecting at least one monohalogenated propylene in the vapor phase to decomposition at a temperature of 850° C. to 1050° C. for a time of from .01 to .1 second, calculated at standard temperature and pressure.

2. The process of claim 1 wherein the monohalogenated propylene is selected from the group consisting of alpha and beta monochloropropylenes.

3. The process of claim 1 wherein the monohalogenated propylene is subjected to decomposition in admixture with a diluent gas selected from the group consisting of nitrogen, carbon dioxide, methane and steam.

4. The process of claim 1 wherein the monohalogenated propylene is subjected to decomposition in admixture with steam wherein the molar ratio of steam:monohalogenated propylene is from 8:1 to 20:1.

5. The process of claim 4 in which oxygen is present as an activator.

6. The process of claim 4 in which a halogen is present as an activator.

7. The process of claim 4 in which substantially adiabatic operation is attained by the use of steam preheated to a sufficiently elevated temperature to impart to the steam-monohalogenated propylene mixture the aforesaid temperature.

ARTHUR WILLIAM CHARLES TAYLOR.
DAVID GWYN JONES.
MORAG LAUCHLAN ALLAN.

References Cited in the file of this patent

UNITED STATES PATENTS

| Number | Name | Date |
|---|---|---|
| 1,986,876 | Baxter et al. | Jan. 8, 1935 |
| 2,288,580 | Baehr | June 30, 1942 |
| 2,379,708 | Hearne | July 3, 1945 |

OTHER REFERENCES

Richter's Organic Chemistry (Nordeman, N. Y.), vol. 1 (1944), p. 111.